United States Patent [19]

Meyer

[11] 4,186,111
[45] Jan. 29, 1980

[54] STABILIZED ALUMINOSILICATE HYDROCRACKING CATALYST

[75] Inventor: Jarold A. Meyer, Concord, Calif.

[73] Assignee: Chevron Research Company, San Francisco, Calif.

[21] Appl. No.: 935,415

[22] Filed: Aug. 21, 1978

Related U.S. Application Data

[60] Division of Ser. No. 769,625, Feb. 16, 1977, Pat. No. 4,137,146, which is a continuation-in-part of Ser. No. 586,674, Jun. 13, 1975, abandoned.

[51] Int. Cl.$^2$ .......................... B01J 37/02; B01J 29/06
[52] U.S. Cl. .................................. 252/453; 252/455 R; 252/460
[58] Field of Search .................... 252/453, 455 R, 460

[56] References Cited

U.S. PATENT DOCUMENTS 3,978,001  8/1976  Meyer ................................. 252/453

Primary Examiner—Carl F. Dees
Attorney, Agent, or Firm—D. A. Newell; R. H. Davies; D. L. Hagmann

[57] ABSTRACT

A process is described for producing gasoline from a paraffinic hydrocarbon feed wherein the feed is catalytically cracked and then reformed. In the process a novel porous hydrocracking catalyst composite is employed. This catalyst comprises a silica-alumina cracking base component and a noble metal hydrogenation component. It is stabilized as a result of a unique method used for introducing the noble metal in the form of a highly dispersed gravimetric precipitate into a gelatinous silica-alumina cogel precursor of the cracking base component. An organic gravimetric reagent is used for the precipitation. The resulting crackate is reformed by ordinary methods.

3 Claims, No Drawings

STABILIZED ALUMINOSILICATE HYDROCRACKING CATALYST

CROSS-REFERENCE TO RELATED APPLICATIONS

This application is a divisional application of U.S. application Ser. No. 769,625, filed Feb. 16, 1977 U.S. Pat. No. 4,137,146, which is a continuation-in-part of U.S. application Ser. No. 586,674, filed June 13, 1975 and now abandoned.

BACKGROUND OF THE INVENTION

1. Field

The present invention is concerned with the production of reformed cracked gasoline in a combination process employing catalytic hydrocracking and catalytic reforming stages. A novel stabilized catalyst containing a silica-alumina cracking base component is employed in the catalytic cracking stage. The cracking base component is of the simultaneously coprecipitated cogel-type.

2. Prior Art

The prior art abounds with methods for the production of catalysts comprising a metal associated with the surface of a porous inorganic oxide support. In accordance with the prior art, said catalyst can be produced in a variety of ways, for example by impregnating a preformed inorganic oxide carrier with the metal or by coprecipitating the metal as an oxide or hydroxide along with the materials forming the porous inorganic oxide support; for example, the pH of a solution containing dissolved silica, alumina and palladium can be adjusted to the point where the silica and alumina coprecipitate and the palladium is chemisorbed to a limited extent onto the resulting silica-alumina coprecipitate, said palladium being primarily in the form of soluble palladium hydroxide and/or palladium salts. The palladium does not coprecipitate along with the silica and alumina, since the palladium cation and, more particularly, palladium hydroxide, are soluble at pH's within the range that silica and alumina coprecipitate.

The preparation of cogelled silica-alumina cracking catalyst base components and catalytic cracking components by simultaneous precipitation is described in U.S. Pat. No. 3,280,040.

U.S. Pat. No. 2,662,861 teaches preparing: (1) a slurry of alumina, washing it, adding a promoter, bubbling hydrogen sulfide through (2) a solution of chloroplatinic acid hexahydrate, mixing (1) and (2) together and drying to form a catalyst. A similar process is disclosed in U.S. Pat. No. 3,617,509.

U.S. Pat. No. 2,898,305 teaches mixing silica in a slurry form with an insoluble inorganic compound, drying and calcining.

U.S. Pat. No. 2,688,603 teaches catalyst preparation by distributing an organic compound containing a potentially catalytically active metal on the surface of a suitable support and decomposing the organic portion of the molecule.

U.S. Pat. No. 3,210,296 teaches impregnating an inorganic oxide support by use of a noble metal compound dissolved in an alcohol, ether, aldehyde, ketone, or mixtures thereof.

U.S. Pat. No. 3,801,515 teaches preparing a finely divided metal by reducing a metal-containing compound in an aqueous medium and intimately intermixing the metal with a gelatinous precipitate. It has been surprisingly discovered that when catalysts comprising a noble metal of Group VIII associated with a porous inorganic oxide support are prepared by the method of the present invention, a larger proportion of the metal, preferably palladium, attempted to be incorporated into said catalysts is actually incorporated therein than is obtained by the prior art coprecipitation-plus-chemisorption method of catalyst preparation. It has also been surprisingly discovered that when a catalyst is prepared according to the present invention the resulting catalyst exhibits exceptional catalytic hydrogenation stability. It is believed that the high catalytic hydrogenation stability found for the catalyst prepared in accordance with the present invention is the result of a more uniform and possibly more specific dispersion of the metal upon the surface of the porous inorganic oxide support than is ordinarily obtained.

SUMMARY OF THE INVENTION

In accordance with the present invention, an improved process is provided for the production of a product comprising reformed cracked gasoline from a substantially paraffinic hydrocarbon feed by steps comprising hydrocracking and reforming wherein the hydrocracking is carried out under ordinary hydrocracking conditions by contacting the feed with a substantially porous hydrocracking catalyst composite, said composite comprising an amorphous simultaneously cogelled silica-alumina cracking base component and at least one catalytic hydrogenation component selected from the group consisting of noble elements of Group VIII of the Periodic Chart of the Atoms, said elements being present in said composite in at least one form selected from the group consisting of oxides and sulfides and the metal, thereby producing a hydrocarbon hydrocrackate; said reforming being effected by contacting at least a substantial portion of said hydrocracking with an ordinary reforming catalyst under ordinary catalytic reforming conditions, thereby producing said gasoline products, the improvement comprising carrying out said hydrocracking using a stabilized catalytic cracking composite, said stabilization being obtained by admixing an organic-metal compound precipitate with a freshly prepared gelatinous silica-alumina precursor of said cogelled cracking base component, said precipitate resulting from the interaction, by complex compound formation or metathesis, of a water-soluble compound of at least one of said elements with at least one organic gravimetric reagent therefor, said reagent and compound exhibiting a solubility product, Ksp, of less than about $10^{-3}$; and converting the resulting mixture into said stabilized catalyst, said converting comprising at least a step of calcining by maintaining said resulting mixture at a temperature in the range of from about 500° F. to 1800° F. for a period sufficient for expelling volatile portions of the mixture and in the range of from about 1 to 48 hours.

Other aspects of the invention include the aforementioned process wherein:

(A) (a) the cracking base component is at least 80 weight percent amorphous silica-alumina of which the alumina content is in the range from about 30 to 98 weight percent and the balance of said cracking base component comprises at least one inorganic refractory oxide selected from the group consisting of oxides of Group II and of the other refractory oxides of Groups III and IV;

(b) the hydrocracking catalyst composite has a surface area in the range from about 50 to 700 m²/gram;

(c) the hydrogenation component is selected from the group consisting of platinum and palladium;

(d) the solubility product, Ksp, is less than about $10^{-5}$; and (e) the hydrocrackable hydrocarbon feed contains at least a 20 volume percent fraction which is heavier than gasoline;

(B) (a) the cracking base component is at least about 90 weight percent amorphous silica-alumina of which the alumina content is in the range from about 40 to 95 weight percent and the balance of said cracking base component comprises at least one inorganic refractory oxide selected from the group of inorganic refractory oxides;

(b) the hydrocracking catalyst composite has a surface area in the range from about 150 to 500 m²/gram; and (c) the solubility product, Ksp, is less than about $10^{-5}$;

(C) the Group VIII element is selected from the group consisting of platinum and palladium;

(D) the hydrocrackable feed is a gas oil having a boiling point range from about 400° F. to 1050° F.;

(E) the cracking base component consists essentially of silica and alumina;

(F) the gravimetric reagent is at least one organic compound selected from the group consisting of oximes, azoles, mercaptides and anilides;

(G) the gravimetric reagent is at least one organic compound selected from the group consisting of azoles which contain an aromatic ring and inertly substituted derivatives thereof;

(H) the precipitation of the noble metal compound is effected in situ in said gelatinous silica-alumina precursor;

(I) there is a further improvement wherein the reforming is carried out using a stabilized platinum-group-containing reforming catalyst, said stabilization being obtained by admixing a freshly prepared gelatinous precipitate selected from the oxides of the metals of Groups II, III and IV with an organic-metal compound precipitate, said organic metal compound precipitate resulting from the interaction, by complex compound formation or metathesis of a water-soluble compound of platinum or palladium with at least one organic gravimetric reagent therefor, said reagent and compound exhibiting a solubility product, Ksp, of less than about $10^{-3}$; and converting the resulting mixture into said stabilized reforming catalyst, said converting comprising at least a step of calcining by maintaining said mixture at a temperature in the range of from about 500° F. to 1800° F. for a period sufficient for expelling volatile portions of the mixture and in the range of from about 1 to 48 hours; and (J) the gravimetric agent is 1,2,3-benzotriazole and inertly substituted derivatives thereof.

Yet further aspects of the invention include:

(A) a composition which is a precursor of the aforementioned stabilized hydrocracking catalyst; and (B) other and more particular modifications of the aforementioned invention which will be evident from the examples and description to follow.

THE HYDROCRACKING CATALYST COMPOSITE

The Cracking Base Component

The catalyst of the present invention may contain any cracking base component obtained by simultaneously coprecipitating silica and alumina from an aqueous solution or sol of sodium silicate or silica and of an aluminum compound which is a precursor of alumina hydrogel (i.e., which forms the hydrogel when the pH of the aqueous solution or sol is increased or decreased). The relative amount of amorphous silica-alumina in the cracking base component should be at least 80 weight percent, more preferably at least 90%, and most preferably should consist essentially thereof. The relative amount of alumina in the amorphous silica-alumina portion of the cracking base may vary widely and is usually in the range 30 to 98 weight percent (water-free basis), preferably 40 to 95 weight percent. The balance of the cracking base component may be one or more refractory inorganic oxides or combinations of such oxides of Group II and of the other oxides of Groups III and IV, preferably gel-forming oxides. Typical inorganic oxides that can constitute said balance are magnesia, zirconia, titania, and mixtures thereof.

The cracking base component and the hydrocracking catalyst composite must be substantially porous, that is, must contain sufficient pores to provide a surface area (BET method) of at least about 50 m²/g of the base or of the catalyst composite. Usually this surface area will be in the range 50 to 700 (i.e., substantially porous), preferably 150 to 500 m²/g.

The Catalytic Hydrogenation Component

One or more of the noble elements of Group VIII provide the hydrogenation component required for the novel hydrocracking catalyst of the invention. Preferably the element is platinum or palladium, and most preferably is palladium. The hydrogenation component may be present in the activated catalyst in the oxide, sulfide or metallic form or any combination thereof. While compounds of these elements may chemisorb to some extent from their aqueous solution onto or into a gelatinous silica-alumina precipitate, this effect does not reduce the suitability of the noble metal compound for use in the present invention. In the case of the present noble metals, this chemisorption, in general, is incomplete and/or relatively easily reversed. And therein lies a serious problem in that the high cost of the noble metals makes any loss a costly loss. In direct contrast, the organic gravimetric reagents herein form tight organic-metal complex compounds or metathesis products which precipitate from an aqueous medium, which do not dissociate readily upon dilution and which are for all practical purposes wholly retained in the precipitated gelatinous silica-alumina precursor of the catalytic hydrocracking composite of the present invention. Accordingly, supernatant water may be drained away from the gelatinous precipitate with little or no loss of the noble metal compound, and other operations, including water-washing of the gelatinous composite, drying of this composite by suction filtration and the like steps may be conveniently carried out, again with little or no loss of the noble metal, particularly where the Ksp (see discussion below) for the gravimetric reagent-metal compound combination is less than about $10^{-5}$.

In view of their high cost, the amount of noble metals, calculated as metal, desirably present in the hydrocracking catalyst composite herein will be an amount in the range 0.01 to about 3 weight percent of the total composite, and more preferably in the range from about 0.02 to about 1.0 weight percent. When a metal is present in the catalyst in a relatively small amount, it is very desirable that the metal be finely divided and dispersed as uniformly as possible over the surface, both internal and external, of the support. This insures that a greater effective metal surface area will be present in the catalyst. The organic-metal compound precipitates produced in the gravimetric precipitation herein do not appear to agglomerate or cluster seriously. Accordingly, the precipitated noble metal compound is found to be rather uniformly distributed throughout the gelatinous silica-alumina precipitate in the formation of the composite precipitate which is the precursor of the hydrocracking catalyst herein.

Metals which promote the activity of the Group VIII noble metals for hydrogenation-dehydrogenation, such as, for example, rhenium, technetium, lead, tin and germanium, may be present in an amount from 0.01 to 3 weight percent of the catalytic composite, and more preferably in the range from about 0.02 to about 1.0 weight percent. These promoters, in general, may also advantageously be incorporated in the catalyst by the gravimetric precipitation method of the present invention.

THE ORGANIC GRAVIMETRIC PRECIPITANT

Organic compounds, in general, suitable for use as gravimetric reagents for the noble metal compounds in aqueous media are suitable for use in the practice of the invention and are contemplated for such use (see "The Analytical Chemistry of the Noble Metals", by F. E. Beamish, Pergamon Press, which is incorporated herein by reference, for extensive description re organic gravimetric reagents and their use in noble metal analysis by precipitation).

Suitable organic gravimetric reagents are, in general, organic compounds which have no carbon-metal linkages and have at least a moderate solubility in water. In their use, the organic compound reacts or interacts with the noble metal compound by one or more reaction mechanisms including complex-compound formation and metathesis and a water-insoluble compound is formed. Representative reactions are as follows:

(1) $2 (1,2,3$-benzotriazole$) + PdCl_2 \rightarrow PdCl_2(1,2,3$-benzotriazole$)_2 \downarrow$ complex compound (2) $2$ (o-hydroxyphenyl)benzoxazole$ + PdCl_2 \rightarrow Pd(C_{13}H_3NO_2)_2 \downarrow + 2$ HCl metathesis product The precipitates produced by the reaction of an organic gravimetric reagent with a noble metal compound as herein are believed to involve, in general, bonding (polar and/or coordinate complex) between the metal cation and one or more nonmetallic (such as oxygen, nitrogen and sulfur), electron-rich constituents of the organic compound. For convenience and by definition, these are referred to herein as organic-metal compounds.

Whether a gravimetric reagent is satisfactory depends upon the desired degree of precipitation of the metal constituent from the aqueous solution. In general, the reagent should be one for which the solubility product for an aqueous medium [Ksp, i.e., (molar concentration of the organic gravimetric compound) (molar concentration of the noble metal)=Ksp; see "Qualitative Chemical Analysis" by A. A. Noyes, page 122] at the precipitation temperature is less than about $10^{-3}$, preferably less than $10^{-5}$ in the case of the costly metals, for example the Group VIII noble metals. In a corollary sense, the foregoing in general requires that a satisfactory organic gravimetric compound have a water solubility of at least about 0.01 molar (a moderate water solubility) and preferably a solubility of at least about 0.1 molar.

Representative organic gravimetric reagents suitable for use herein include:
1,2,3-benzotriazole
nioxime
1,10-phenanthroline
alpha-nitroso-beta-naphthol
2-hydroxy-1-naphthaldehyde
dimethylphenylbenzylammonium chloride
phenylsemicarbazide
phenothiazine
thiourea
2-mercaptobenzothiazole
thiophenol
dimethylglyoxime
alpha-furildioxime
thionalide
thioacetamide
beta-mercaptopropenoic acid
2,3-dimercapto-1-propanol
strychnine sulfate
acridine
2-phenylbenzothiazole
thiobarbituric acid
2-mercaptobenzoxazole
thioacetanilide
ammonium p-aminophenyldithiocarbamate
1-nitroso-2-naphthol
salicyladoxime
benzoylmethylglyoxime
beta-furfuraldoxime
alpha-benzoinoxime oxaldenediamidoxime
2-thiophenetransaldoxime
2-o-hydroxyphenylbenzoxazole
N-phenyl-N-phenylazohydroxylamine
6-nitroquinoline
5-methyl-8-hydroxyquinoline
quinaldinic acid
quinolinic acid
beta-aminopicolinic acid
alpha-picolinic acid
peaselenol
1,3-dimethyl-4-imino-5-hydroxyimino alloxan
alpha,beta-bis(hydroximino)acetoaceto-o-toluidide
3-hydroxy-1-(p-tolyl)-3-phenyltriazine
p-thiocyanatoaniline
p-aminosalicylic acid
p-aminoacetophenone phthalinilic acid
1-naphthylphthalanilic acid
p-tolyphthalanic acid
o-carboxyisonitrosoacetanilide
alpha,beta-dioximidoacetoacetanilide
2-mercaptobenzimidazole
phenylthiohydantoic acid
diethyldithiophosphoric acid
and the like organic gravimetric reagents. Of the particular classes of organic gravimetric reagents, the oximes, azoles, mercaptides and anilides, the azoles are preferred for use herein. Of the latter, the azoles which contain an aromatic ring, for example 1,2,3-benzotriazole and the like, and the inertly substituted derivatives thereof, are most preferred, particularly for use with Group VIII noble metals, because of the efficient precipitation of these metals by them. By "inert," having reference to substituents, is meant a substituent which does not cause reduction to the metal of the catalytic metal constituent of the noble metal compound. The precipitation of a noble metal compound in an aqueous medium by an organic gravimetric reagent is conventional in analytic chemistry, and it is to be understood that this practice of itself is not the gist of the present invention.

THE GELATINOUS PRECIPITATE

The preparation of gelatinous precipitates comprising alumina and silica, i.e., silica-alumina precipitates, by simultaneous coprecipitation of hydrogel-forming compounds of silicon and aluminum from a common solution or sol is known and described in the art (see, for example, U.S. Pat. No. 3,280,040).

It is essential to the practice of the invention that the inorganic oxide gelatinous precipitate be freshly prepared. If the inorganic gelatinous precipitate is allowed to age for a time before the organic-metal compound is formed therein and is intimately intermixed therewith, an inferior catalyst will result. While not wishing to be bound to this explanation, it is believed that longer delays allow the gelatinous precipitate to further set up, forming "cross-links," which forestall uniform distribution of the precipitated metal compound in the gelatinous precipitate and ultimately on all the surfaces of the support. Usually the delay should be no more than about 2 hours, and preferably there should be no more than a 1-hour delay between the formation of the gelatinous precipitate and the incorporation of the noble metal into the gelatinous precipitate.

The incorporation of the organic-metal compound of the noble metal into the gelatinous precipitate may be accomplished in any suitable way, for example by:

(1) in situ formation of the organic-metal compound precipitate of the noble metal compound in a preformed gelatinous precipitate;

(2) simultaneous and in situ formation of the gelatinous precipitate and of the organic-metal compound precipitate; and (3) formation separately of the aforementioned precipitates and thereafter intermixing them.

Method (1) is a preferred method. Thus, in this case, the suitability of the gel formation is assured before the costly noble metal component is committed to the mix. Where the suitability of the precursor materials is assured, for example by a prior test or experience, method (2) is then particularly preferred.

The intimate intermixing is preferably accomplished as follows: an aqueous medium is formulated comprising: (1) dissolved precursors of the gelatinous precipitate: and (2) dissolved noble metal compound. The pH of the solution is adjusted by the addition of base or acid thereto until the gelatinous precipitate results. An organic precipitating agent is then added, for example a benzotriazole, to the aqueous slurry of the freshly prepared inorganic oxide gelatinous precipitate while agitating the slurry to precipitate the dissolved metal as finely divided organic-metal compound. In large part, this precipitate is formed in situ in the aqueous gel (hydrogel) and the balance, if any, is substantially (at least about 95% efficient) incorporated into the gel by the intimate intermixing.

While it is preferred that the gelatinous precipitate be formed prior to or concurrently with the precipitation of the organic-metal compound, the method of manufacturing a catalyst of the present invention can be carried out by first precipitating the organic-metal compound followed by precipitation of the inorganic oxide or precursor thereof. It may in this situation be desirable in some cases to stabilize the finely divided organic-metal compound to inhibit any tendency of the particles to agglomerate by use of suitable stabilizers such as casein, polyacrylic acid, and the like.

The term "intimately intermixing" is used to mean that the finely divided organic metal compound is uniformly distributed on the surface of the fresh inorganic oxide gelatinous precipitate. Generally, it is quite desirable that agitation take place to more completely accomplish the intimate intermixing. The agitation may be continuous or intermittent.

Once the finely divided organic-metal compound has been intimately intermixed with the fresh inorganic oxide gelatinous precipitate, the resulting mixture may then be treated by conventional methods to form catalyst particles of a practical and useful size. Thus, this mixture is a novel composition, a catalyst precursor, which is useful for the preparation of a novel hydrocracking catalyst composite, which may be characterized as follows:

(1) a silica-alumina component having an alumina content, calculated on the basis of the respective oxides, in the range from about 40 to 95 weight percent;

(2) a Group VIII noble metal organic-metal compound content, calculated as the metal and based upon said silica-alumina content, the latter calculated as the oxides, in the range from about 0.1 to 3 weight percent; and (3) a residue comprising water, resulting water-soluble inorganic salts, and a minor amount of the organic gravimetric reagent.

Generally, the intermixed organic-metal compound-gelatinous precipitate is water-washed or ion-exchanged to remove soluble components, formed into particles, as for example by extruding or the like, and the particles are then heated to a temperature within the range from about 500° to about 1800° F. for from about 1 hour to about 48 hours. The heating serves to decompose the organic residue. The heating will further serve to calcine and activate the catalytic composite. Preferably, for the hydrocracking catalysts herein, the heating will take place at a temperature within the range from about 950° F. to about 1800° F. for from about 2 hours to about 8 hours.

The product produced in accordance with the present invention will, after the heating step, preferably exhibit a parameter consisting of the product of the bulk density in grams per cc of the particles and the surface area in square meters per gram which falls within the range from about 100 $m^2/cc$ to about 500 $m^2/cc$, and more preferably, especially when the catalyst is a hydrocracking catalyst, within the range from about 200 $m^2/cc$ to about 500 $m^2/cc$.

HYDROCRACKING STAGE

The Feed

The novel stabilized catalytic cracking composite of the present invention is suitable for use in converting substantially paraffinic (less than 10 volume percent aromatic hydrocarbon content) hydrocrackable hydrocarbon feeds under conventional hydrocracking conditions, and these feeds and conditions are contemplated for use herein. Preferably the organic nitrogen content of the hydrocarbon feedstocks should be below about 0.05 weight percent, more preferably below about 0.02 weight percent, and most preferably below about 10 ppm. The organic sulfur content of the feedstocks also should be below about 0.05 weight percent, preferably below about 0.02 weight percent, and more preferably below about 10 ppm. If desired, the hydrocarbon feedstocks may be subjected to a conventional hydrofining pretreatment step prior to being converted in the presence of the catalyst of the present invention. The hydrocrackable hydrocarbon feeds particularly contemplated for use herein vary over a wide range and are petroleum distillates having boiling-point ranges in the range from about 325° F. to about 1050° F. and higher and which contain a substantial (above about 20 volume percent) fraction which is heavier than gasoline, i.e., boils above about 383° F. Representative suitable hydrocrackable hydrocarbon feeds include naphthas, kerosene distillates, gas oils, vacuum gas oils, heavy vacuum gas oils, cycle oils, recycle oils, mixtures thereof, and the like having an aromatic content of less than about 10 volume percent. These feeds may be obtained as all or a portion or the product stream from straight runs, thermal cracking, catalytic cracking and the like hydrocarbon processing operations using feeds derived from petroleum, gilsonite, shale, coal tar and the like sources. Prior to use as feeds for the hydrocracking stage herein, the aforementioned feeds may also have been subjected to one or more processing steps including desulfurization, demetallation and denitrification. Preferably the feed is a vacuum gas oil having a boiling point (ASTM-D1160) in the range from about 400° F. to about 1050° F., more preferably from about 500° F. to about 950° F.

The Conditions

The hydrocracking process conditions herein may be ordinary hydrocracking conditions, for example a temperature within the range from about 450° F. to about 850° F., a pressure within the range from about 500 psig to about 3500 psig, a liquid hourly space velocity within the range from about 0.5 to about 3.0, and a total hydrogen rate within the range from about 1000 SCF to about 20,000 SCF, preferably from about 2000 SCF to about 10,000 SCF, of hydrogen per barrel of feedstock.

When the catalyst is contacted with the hydrogen used in a hydrocracking reaction, some reduction to metal of any metal oxides that are present will take place. This is not detrimental, and in fact is necessary to develop the ordinary catalytic hydrogenation activity of the catalyst, so long as the hydrogen does not contact the catalyst at a temperature appreciably higher than the reaction temperature at the start of the run, i.e., a temperature high enough to cause sintering of the metal on the catalyst with concurrent metal surface area reduction.

Reforming Stage

Ordinary reforming conditions and catalysts are contemplated for use in the invention, including the use of a conventional reforming catalyst which comprises at least one refractory oxide and a metal component selected from the group consisting of the metals and compounds of the metals in the platinum group, preferably in a hydroforming stage wherein low-pressure hydroforming conditions are employed (see, for example, U.S. Pat. No. 3,415,737 and the references cited therein). In a further preferred embodiment, the hydrocracking catalytic composite and the reforming catalyst are both prepared using an organic gravimetric precipitating reagent as herein for the incorporation of the noble metal into a gelatinous metal (Groups II, III and IV) oxide (hydrogel) precipitate which is a precursor to the respective hydrocracking or reforming catalyst.

The Feed

At least a substantial (at least 25 volume percent thereof) portion of the feed to the reforming stage will comprise all or any suitable reformable fraction of the hydrocrackate effluent from the hydrocracking stage of the present invention. The balance of the feed, if any, may comprise a reformable (i.e., paraffinic and/or naphthenic hydrocarbons which contain at least 6 carbon atoms per molecule) hydrocarbon fraction having a boiling-point range in the range from about 75° F. to 450° F., for example a suitable refinery stream. Preferably the total feed to the reforming stage has a boiling-point range in the range 75° F. to 450° F. and has an aromatic hydrocarbon content which constitutes less than about 10 volume percent of the feed.

The Catalyst

Platinum-group-containing reforming catalysts comprising a platinum group component and at least one refractory oxide of elements of Groups II, III and IV oxides, preferably consisting essentially of alumina, and a halogen component are contemplated for use herein and are well known in the art, except in the case of those catalysts wherein the metal is gravimetrically incorporated into an otherwise conventional catalyst composite by the novel method described above. As used herein and by definition, by the term "ordinary noble-metal-containing reforming catalyst" is meant the aforedescribed conventional reforming catalysts. The platinum-group component of these reforming catalysts is present in one or more of the metal, metal oxide, metal sulfide and metal halide forms. In addition to the platinum group metal, and as conventional in the art, one or more promoter components may also be present in the reforming catalyst, for example a rhenium and/or tin component, which may also be present in one or more of the aforementioned forms.

Reforming Process Conditions

Ordinary reforming conditions are contemplated for use in the present invention and in general include a temperature in the range 700°–1000° F., a pressure in the range 50 to 1000 psig, a hydrogen gas-to-hydrocarbon mol ratio in the range 1:1 to 10:1, and a liquid hourly space velocity, volume of feed per volume of catalyst (LHSV), in the range from 0.2 to 10. For the preferred low-pressure conditions herein, a temperature in the range 880°–975° F., a total pressure in the range 75 to 500 psig (partial pressure of $H_2$ of 60 to 80% of total pressure), a hydrogen gas-to-feed mol ratio in the range 1–10, and an LHSV in the range 0.75 to 5.0 are contemplated for use with a platinum-rhenium-alumina reforming catalyst composite. The resulting gasoline reformate has an excellent octane number (F-1 Clear) in the range 80 to 110.

EXAMPLES

The invention will be better understood with reference to the illustrative examples which follow.

EXAMPLE 1

Prior Art Catalyst

A silica-alumina cogel was made following the general procedure set forth below.

1130 g of $AlCl_3 6H_2O$ were dissolved in 5 liters of $H_2O$, and 125 ml of glacial acetic acid were added to form a first solution. 450 g of sodium silicate were dissolved in 2.5 liters of water to form a second solution. Said first and second solutions were combined to form a mixture, the pH of which was adjusted to 6.5 by the addition of 3 liters of a solution of 2 parts of $H_2O$ and 1 part $NH_4OH$. The resulting mixture, in the form of a suspension, was heated to 150° F., the pH was readjusted to 6.5, and the mixture was filtered to produce a cogel paste filter cake. The filter cake was dried at 95° F. to a solids content of 30%. The solids were washed 4 times in about 10 liters of 1% ammonium acetate solution at 150° F. The washed gel was contacted with a solution containing 0.66 g palladium tetraammine dinitrate in 570 ml of water for about 1 hour. The solution was removed and the cogel, in 10-16 mesh form, was dried and a portion was calcined in substantially dry air for 4 hours at 450° F., 8 hours at 1000° F. and 4 hours at 1400° F.

This catalyst was used to hydrocrack a feedstock having the characteristics set forth in Table I below.

TABLE I

| ASTM D-1160 Boiling Range, °F. | |
| --- | --- |
| Start | 553 |
| 5% | 589 |
| 10% | 595 |
| 30% | 617 |
| 50% | 646 |
| 70% | 684 |
| 90% | 732 |
| 95% | 763 |
| End | 859 |

| Other characteristics: | |
| --- | --- |
| Gravity, API | 39.9 |
| Aniline point, °F. | 192.7 |
| Sulfur, ppm | 1-2 |
| Nitrogen, ppm | 0.1 |
| Pour point, °F. | +55 |
| Paraffins + naphthenes, vol. % | 90 |
| Aromatics, vol. % | 10 |

The feedstock was hydrocracked in a recyle run under these conditions:

| | |
| --- | --- |
| Total pressure, psig | 1200 |
| Liquid hourly space velocity, V/V/hr. | 4.0 |
| Conversion, liquid vol. % to 550° F. | 60 |
| Recycle gas rate, SCF/bbl. of feed | 5600 |
| Boiling range of liquid product recycled | 550° F.+ |

Catalyst inspections and test results are shown in Table II.

EXAMPLE 2

A Catalyst of the Present Invention

A catalyst in accordance with the present invention in which palladium is precipitated as an organic-metal compound was made as follows (all parts by weight unless otherwise specified):

Solution A was 483 parts water, 100 parts glacial acetic acid and 1295 parts of an aluminum chloride solution containing 4.9 weight percent aluminum. Solution B was 278 parts sodium silicate solution (containing 28.7 weight percent $SiO_2$) and 1000 parts water. Solution B was combined with Solution A slowly, with rapid stirring. A clear solution results.

The combined solution was titrated to a pH of 6.0 with a solution of 3 volumes of water to one volume concentrated $NH_4OH$, forming a gelatinous precipitate.

A solution containing 0.441 parts palladium as dissolved $Pd(NO_3)_2$ and $[Pd(NH_3)_4](NO_3)_2$ in about 8 parts water was added to the gel. The mixture was stirred rapidly for about 15 minutes to insure that the palladium was uniformly dispersed throughout the gel. Then added to the gel were about 83 parts water containing 1.49 parts of dissolved 1,2,3-benzotriazole. Addition of the dissolved palladium salt and the benzotriazole was completed within about 40 minutes after the completion of the gel precipitation step. The mixture was stirred rapidly for 15-20 minutes to insure that the benzotriazole was uniformly dispersed throughout the gel. The benzotriazole reacted with the palladium salt to form an insoluble organic-metal compound.

After 1½ hours aging, the slurry was heated to 140° F., the pH adjusted to 6.4, and the slurry was filtered and partially dried to about 70% volatiles content. 17.6 parts of this cake were formed and exchanged 5 times for ½ hours at 150° F. in about 55 parts of water containing 1 weight percent ammonium acetate and having a pH of 6.0. After the exchange, the catalyst was washed once in water and partially dried to a volatiles content of 32.5 weight percent. This material was calcined in substantially dry air for 3½ hours at 400° F., 5 hours at 950° F., and 2 hours at 1400° F. to produce the finished catalyst.

The first filtrate contained 0.4-0.5 ppm palladium. About 3250 parts of filtrate were produced, which therefore contained about 0.0013 to 0.0016 parts of palladium. Thus, over 99.5% of the palladium added remained with the filter cake. Analysis of the final catalyst confirmed that essentially all the added palladium is in the finished catalyst.

This catalyst was tested using the same feed and test conditions as Example 1. Catalyst inspections and test results are shown in Table II.

The run length obtained with this catalyst was 50% greater than obtained with a comparable prior art catalyst. This was accomplished without sacrificing product selectivity. In addition, the hydrogenation component was added during the normal production of the silica-alumina component, thereby eliminating the need for the costly steps associated with impregnation of the hydrogenation component.

TABLE II

| | Example No. | |
| --- | --- | --- |
| | 1 | 2 |
| Palladium content (wt. %) | 0.24 | 0.24 |
| Bulk density, grams/cc | 0.86 | 0.89 |
| Surface area, m²/gram | 363 | 345 |
| Final calcination temperature, °F. | 1400 | 1400 |
| Run length (hours to 680° F.) | 380 | 570 |
| C5+ liquid vol. % | 105.6 | 105.4 |
| C5+ wt. % yield at 640°-650° F. hydrocracking temperature | 93.5 | 93.6 |
| 250°-liquid vol. % yield at 640°- | | |

TABLE II-continued

| | Example No. | |
|---|---|---|
| | 1 | 2 |
| 650° F. hydrocracking temperature | 64.3 | 64.9 |

As in the above example, it is usually more desirable that the metal compound be intimately intermixed into the gelatinous precipitate followed by the introduction of the organic gravimetric reagent and the ensuing precipitation of the organic-metal compound. The order of the introduction of the reactants, the soluble metal compound and the organic gravimetric reagent may also be reversed. In this event, the gravimetric reagent is intimately admixed with the gel, is incorporated in substantial part therein; and then the water-soluble noble metal is likewise incorporated into the gel. Again, the desired insoluble organic-metal compound, complex compound and/or unsoluble metathesis product, is formed substantially in situ in the gelatinous precipitate and a useful catalyst precursor is produced. It will be clear in view of the foregoing description and examples that in general the present method is an improved and effective means for producing catalysts which contain a noble metal component.

It will also be clear that the present invention provides new and useful precursors for the production of new and improved catalytic hydrocracking catalyst composites and catalytic reforming catalyst composites in which the noble metal catalytic component of the respective catalyst is stabilized by the gravimetric precipitation method described above. Further, in view of the foregoing, it will be clear that the present invention provides a new and advantageous combination hydrocracking-hydroforming process.

It is apparent that many widely different embodiments of this invention may be made without departing from the scope and spirit thereof; and, therefore, it is not intended to be limited except as indicated in the appended claims.

What is claimed is:

1. A composition suitable for use as a catalyst precursor which comprises:
    (1) an amorphous silica-alumina component having an alumina content, calculated on the basis of the respective oxides in the anhydrous form, in the range from about 40 to 95 weight percent, said silica-alumina having been simultaneously cogelled;
    (2) a Group VIII noble metal organic-metal compound component having a noble metal content, calculated as the metal and based upon said silica-alumina content, in the range from about 0.1 to 3 weight percent, said organic-metal noble metal compound component, a precipitate, having been produced by the interaction by complex compound formation or metathesis in aqueous medium of a water-soluble compound of at least one of said noble metals with at least one organic gravimetric reagent therefor, said reagent and compound exhibiting a solubility product, Ksp, of less than about $10^{-3}$; and
    (3) a residue comprising water, water-soluble inorganic salts resulting from said cogelation and said interaction, and a minor amount of said reagent.

2. A composition as in claim 1 wherein said gravimetric reagent is selected from the group consisting of oximes, azoles, mercaptides and anilides.

3. A composition as in claim 1 wherein said gravimetric reagent is selected from the group consisting of 1,2,3-benzotriazole and inertly substituted derivatives thereof.

* * * * *